(12) United States Patent
Kitain et al.

(10) Patent No.: US 7,051,030 B2
(45) Date of Patent: May 23, 2006

(54) METHOD AND SYSTEM FOR MANAGING A DIRECTORY WITH A TEMPLATE

(75) Inventors: Roger Kitain, Gilroy, CA (US); Atul Bhandari, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 490 days.

(21) Appl. No.: 09/973,184

(22) Filed: Oct. 10, 2001

(65) Prior Publication Data

US 2003/0037052 A1 Feb. 20, 2003

Related U.S. Application Data

(60) Provisional application No. 60/310,529, filed on Aug. 6, 2001.

(51) Int. Cl.
*G06F 7/00* (2006.01)
*G06F 17/30* (2006.01)
*G06F 15/173* (2006.01)

(52) U.S. Cl. ............ 707/10; 707/2; 707/3; 707/200; 709/223

(58) Field of Classification Search ........ 707/3, 707/10, 2, 4, 5, 200; 709/223; 712/200
See application file for complete search history.

(56) References Cited

U.S. PATENT DOCUMENTS

| 6,195,696 | B1 * | 2/2001 | Baber et al. ............. 709/223 |
| 6,208,986 | B1 * | 3/2001 | Schneck et al. ............. 707/3 |
| 6,484,177 | B1 * | 11/2002 | Van Huben et al. ......... 707/10 |
| 2002/0147857 | A1 * | 10/2002 | Sanchez et al. ........... 709/316 |
| 2003/0028752 | A1 * | 2/2003 | Fu et al. .................. 712/200 |
| 2003/0097355 | A1 * | 5/2003 | Kapitskaia et al. .......... 707/3 |

OTHER PUBLICATIONS

LDAP Implementation Cookbook, Johner et al., Jun. 1999, IBM.*
XML Articles and Papers., Jan.-Mar. 2000, a Google search result, Nov. 21, 2004.*

* cited by examiner

*Primary Examiner*—Greta Robinson
*Assistant Examiner*—Kuen S. Lu
(74) *Attorney, Agent, or Firm*—Martine Penilla & Gencarella, LLP

(57) ABSTRACT

A system of managing a directory with templates. A template file is created containing various structure templates. The templates entries may then be loaded into the directory or be read directly from the file by users. The templates provide structure information to users of the directory, and allow an administrator to more easily configure part or all of the directory.

16 Claims, 2 Drawing Sheets

METHOD AND SYSTEM FOR MANAGING A DIRECTORY WITH A TEMPLATE

RELATED APPLICATION

This application claims priority to U.S. provisional application No. 60/310,529, titled, "Configuring the Heirarchical Structure of Directory Entries/Managing Composite Directory Object", filed Aug. 6, 2001, the contents of which are herein incorporated by reference.

FIELD OF THE INVENTION

The present invention is in the field of directory management, specifically aimed at managing the directory with a template.

BACKGROUND OF THE INVENTION

Computer networks often contain numerous resources, varying in type, size, and use. These resources include computers and peripheral devices. In order to consistently identify such resources and facilitate their use by users, networks provide directory services. Directories normally contain information about the resources, (i.e., email addresses on the network). Ideally, a directory service will hide the physical implementation of the network it is provided on, representing the various resources of the network in a consistent manner. This has the advantage of allowing users to address any resource on a network without knowledge of the actual physical configuration of the network, the resource, or its connection to the network.

One of the most important directory services in use today is the Lightweight Directory Access Protocol (LDAP). The LDAP directory service model is based on entries. Each entry in LDAP comprises a collection of attributes. In turn, each attribute consists of a type and one or more values. The type of an attribute identifies the format of the data contained in the values of that attribute. Thus, an attribute with the type "mail", for example, might contain one or more email addresses in its value fields. In addition to attributes, each entry also has a unique name, called a "distinguished name". The distinguished name makes possible unambiguous references to the entry.

Entries in an LDAP directory service are organized in a tree structure. Under the protocol, data may be stored in any arbitrary fashion, as long as a tree structure is maintained. Presently, there are no well-defined protocols for structuring Directory Information Trees (DITs). This may not be a problem for an application that sets up its own directory and populates it from scratch, since the application can define the structure of its DIT in any manner. When an application has to work with an existing directory, however, it will have to first become familiar with the DIT structure in use. And this may prove to be a daunting task, especially in the case of large and complex directories.

Aside from the issue of familiarizing new applications with existing directory structures, there is also the problem of imposing standard structures throughout a directory. Presently, if an organization wishes to impose such a standard, it must do so through an administrator who would need to manually maintain the structure of the DIT each time an entry is added, deleted, or modified.

Accordingly, there exists a need for a method and system for managing a directory so that when entries are created in the directory, the rest of the defining structure can be built automatically.

BRIEF SUMMARY OF THE INVENTION

The present invention may include a method for managing a directory comprising the steps of creating a template to define the directory comprising one or more definitions corresponding to one or more object types, wherein for a given one of said object types, said corresponding definition identifies zero or more others of said object types that should be automatically created and added to the directory whenever said given object type is added to the directory; creating an object of said given type; adding said object of said given type to the directory; automatically creating zero or more objects of said others of said object types; and adding said zero or more objects to the directory. In one aspect of the invention, the zero or more objects of others of the object types are added as children to the object of the given type in the directory. In another aspect, the one or more object types are Java object types.

In another aspect of the invention, the one or more definitions comprise one or more attributes, and in another aspect, the one or more attributes have values. In another aspect, the step of automatically creating the zero or more objects comprises the steps of selecting one of the definitions that correspond to the given type of object that is created; and reading the zero or more others of the object types from the selected definition. In another aspect, the template is created using a markup language, and in another aspect the markup language is an extensible markup language and/or a generalized markup language.

The present invention may also include a template for managing a directory comprising one or more definitions corresponding to one or more object types, wherein for a given one of said object types, said corresponding definition identifies zero or more others of said object types of zero or more objects that should be created whenever an object of said given object type is added to the directory.

In one aspect of the invention, the one or more object types are Java object types. In another aspect, the one or more definitions comprise one or more attributes. And in yet another aspect, the one or more attributes have values.

The present invention may also include a method for managing a directory of one or more entries comprising the steps of creating a template to provide one or more instruction on how to manage the directory; creating at least one of the entries; and adding said at least one entry to the directory in accordance with at least one of said instructions.

In one aspect, the preferred embodiment further comprises the step of deleting said at least one entry from the directory in accordance with one of the instructions. In another aspect, the one or more instructions comprise one or more definitions corresponding to one or more entry types wherein for a given one of said entry types, the corresponding definition identifies zero or more of said entries that must be added to the directory whenever an entry of said given type is added to the directory.

DETAILED DESCRIPTION OF THE INVENTION

The present invention may include a method and system for managing a directory using structure templates. These templates specify the relationships among the various types of information in directories. Thus, a user (i.e., a person or software application interacting with a directory) can learn about the structure of the directory by consulting the directory's structure templates. Also, when attempting to modify the directory, the user is instructed by the templates as to what modifications are permitted.

One mechanism for the creation of such structure templates is through the use of a markup language such as the Extensible Markup Language (XML). XML is useful in this instance because it easily allows information about a structure to be represented in a form comprehensible both by people and computers. In accordance with the present invention, XML can be used to create the structure template describing the layout of a directory, which will in turn impose the structural requirements of that directory.

Figure 1:
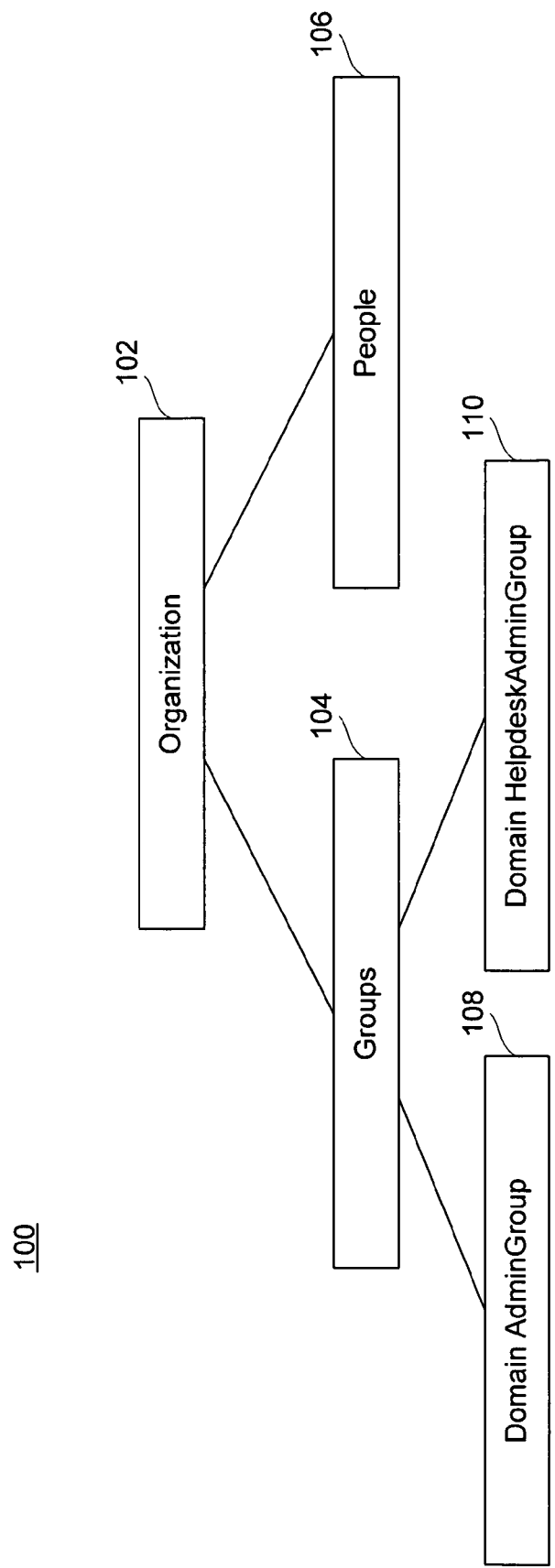
FIG. 1 shows a sub-tree of a typical directory.

FIG. 1 shows a sub-tree 100, of a typical directory, which is starting with an Organization node, of a directory created to hold information about various organizations and their parts. This directory starts with an Organizational nod 102. Each Organization node 102 must have, as its children, container nodes for people (i.e., a People node 106) and groups (i.e., a Groups node 104) within the organization. Each Groups container node 104, in turn, must contain at least a DomainAdminGroup node 108 and a DomainHelpDeskAdminGroup node 110. Therefore, it is desirable to ensure that each time an Organization node is created in the directory, the requisite child nodes, along with the child nodes' requisite child nodes, if any, are also created, resulting in the sub-tree structure of FIG. 1. In accordance with the present invention, a structure template may be created to do this.

In the example of FIG. 1, which demonstrates one of the embodiments of the present invention, the nodes of the directory tree are implemented as objects expressed in classes of the Java programming language ("Java"), which is described in The Java Programming Language, Ken Arnold, James Gosling, Addison-Wesley, 1996, the contents of which are hereby incorporated by reference. Java is a registered trademark of Sun Microsystems, Inc. in the United States and other countries. Other programming languages may, however, be used in other embodiments of the present invention.

Table 1 contains exemplary XML code defining the structure templates that impose the required directory structure for the example shown in FIG. 1. It contains five structure template entries. Each entry corresponds to a node that will be created in the directory tree. Lines 6–26 define the entry corresponding to an Organization node. Lines 31–52 define the entry corresponding to a Groups container node. Lines 57–73 and 78–95 define entries corresponding to DomainAdminGroup and DomainHelpDesk,dminGroup nodes respectively, creation of both of which is required when the Groups container is created. Lines 100–116 define the entry for the People container node, creation of which node is also required when an Organization node is created.

The structure template entries in Table 1 provide structural guidelines in a consistent manner. Each entry contains values for several attributes, which describe the node to be created in the directory tree. Each attribute is wrapped inside an AttributeValuePair tag together with its corresponding value or values. Each AttributeValuePair tag begins with a "<AttributeValuePair>" delimiter and ends with a "</AttributeValuePair>" delimiter, indicating the beginning and the end of the tag, respectively. The attribute name is specified inside an empty Attribute tag (e.g., '<Attribute name="class"/>', line 7), and each corresponding value appears inside a Value tag nested within the AttributeValuePair tag. It is possible for an attribute to contain multiple values, as is the case with the AttributeValuePair tag on lines 13–16 of Table 1.

In this example, the first attribute appearing in each entry is the "class" attribute. This refers to the Java class type of the directory node that the entry corresponds to. In the first entry (Table 1, line 8), for instance, the value "com.iplanet.ums.Organization" specifies the Java type of the object representing an Organization node in the directory tree.

The second attribute in each entry is the "name" attribute. This attribute specifies the name of the node in the DIT, which will be combined with the names of its ancestors to form a distinguished name. In Table 1, this attribute appears in the form of an equation. When a user adds a node to the directory tree, the right-hand side of this equation will be replaced by the value of the attribute 'o', which will be available to the user creating the new node. If, for example, the user creates a node for an organization named "acme", the name of the node will be "o=acme".

Next is an attribute which appears only in entries for nodes whose creation requires the automatic creation of at least one child node. This attribute, called the "childNode" attribute, identifies the entries for the children whose creation is required. The childNode attribute provides ordered links and parent-child relations between individual entries to form a composite object. Lines 14–15 of Table 1 indicate that nodes for "OrganizationalUnit" and "PeopleContainer" should be created under the Organization entry. Similarly, lines 39–40 indicate that the creation of the Organizational Unit node requires the creation of two child nodes.

The "template" attribute identifies a "creation template" that is used to create an entry. The creation template specifies parameters that provide ground rules for creating an entry of that type. The name of the creation template is needed by a process that creates the entry. For example, the creation template used for creating an Organization entry, is called "BasicOrganization".

The "filter" attribute, which appears next, is used to resolve ambiguity if there is more than one template defined with the same class name. It is possible for two or more sibling nodes (i.e., nodes with the same parent node) to have the same class type and name, since it may be desirable to use different structure template entries depending on criteria such as, say, the current date. For instance, it may be desirable to use a different structure template in creating a Groups container node for each month of the year. In that case, the system administrator can set up twelve structure templates with the same template name and "class" attribute but different "filter" attribute values. The administrator can define the template entries so that the value of the "filter" attribute is the name of the month during which that template is to be used. A user can then determine, based on the value of the "filter" attribute, which template to use.

The "priority" attribute is used to resolve ambiguity if there are multiple templates defined with the same name and filter. This is a useful feature because it allows the system administrator to keep multiple versions of the same template in the system, and then choose which version should be in active use simply by adjusting the "priority" attribute values of the different versions. In one embodiment, the version with the lowest priority is the one in current use.

Figure 2:
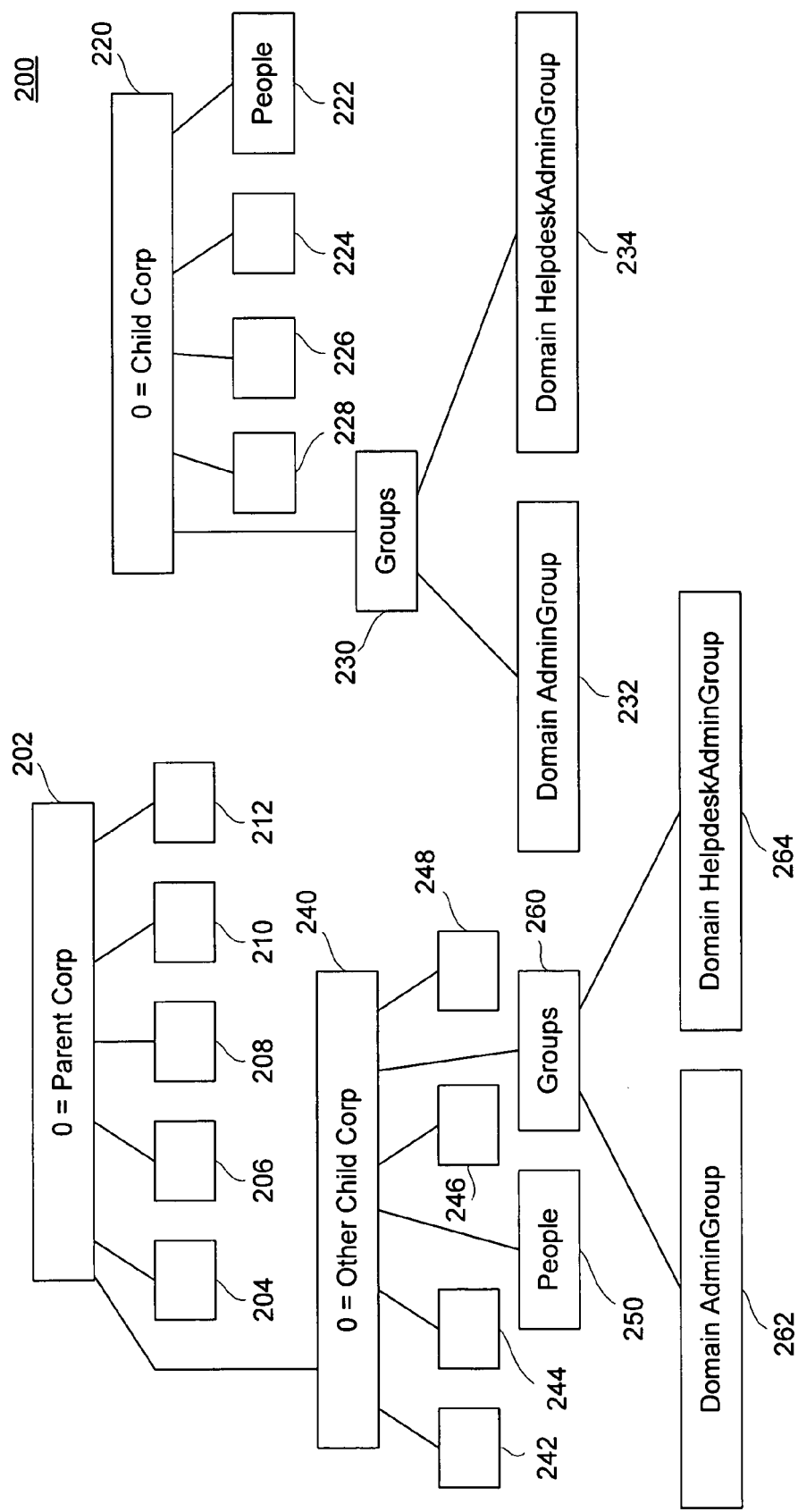
FIG. 2 shows a sub-tree of a directory with the templates of the present invention in place.

In one embodiment of the present invention, the structure templates are stored in the DIT itself. This simplifies use of the templates by eliminating the need for each user to parse a template file. FIG. 2 shows a sub-tree 200 of an exemplary DIT into which structure templates have been loaded. The Organization node 202, with the node name "o=ParentCorp" has, as its children, a set of structure template nodes 204, 206, 208, 210, and 212, which correspond to entries in Table 1. Node 202 also has as its children two other Organization nodes 220 and 240. Node 220, in turn, has as its children a People container node 222, a second set of structure templates 224, 226, and 228, and a Groups container node 230, which has child nodes 232 and 234. Likewise, node 240 has as its children a set of structure templates 242, 244, 246, and 248, a People container node 250, and a Groups container node 260, which, in turn, has as its children two nodes 262 and 264.

In one embodiment, the structure templates are stored in a linear fashion (e.g., not in a hierarchical fashion). That is, all the nodes corresponding to entries in the same structure template file are children of the same parent node, and all structure template nodes are leaf nodes (i.e., nodes without children). The present invention, however, is not limited to such a storage scheme.

In one embodiment of the present invention, the structure template entries are defined in a template file, such as the XML file appearing in Table 1, which is then read and parsed by a software program, which in turn creates nodes in the DIT that correspond to the template entries in the file. In addition, an administrator may choose to create some template nodes in the tree manually. Alternatively, the template entries may be read directly from the template file by each user. This approach, however, may be less efficient.

With the structure template nodes in place, a software program can be created to modify the directory using the structure templates. Extracts from Java code used in implementing one such program appears in Table 2, which defines a Java class called PersistentObject.

When creating a new node in the DIT, a user checks the structure templates to ensure that proper tree structure is maintained. To this end, it first locates the proper set of structure templates. The purpose of allowing the DIT to contain multiple sets of structure templates is to facilitate different structural guidelines throughout the directory. In the system 200 of FIG. 2, for instance, the Organization node 202 has two Organization child nodes 220 and 240, each of which have a set of structure template nodes as children. Thus, the two sub-trees (i.e., the sub-tree under node 220 and the sub-tree under node 240) are controlled by two different sets of structure templates, each set dictating a potentially different structure.

In one embodiment, locating the proper set of structure templates amounts to locating the closest Organization node with a set of templates as one traverses up the tree. Thus, a user adding a new node must traverse up the line of ancestry (i.e., to the parent of the current node, then to the parent of that parent node, and so on) until it finds a node with structure templates as its children.

The PersistentObject class contains a method called addChild (Table 2), which is used to add a child node to an existing node of the directory tree. The existing node is the instance of PersistentObject class upon which the call to addChild is made. The addChild method takes a single argument of type PersistentObject, which is the child node to be added to the tree, under the aforementioned existing node.

Another method is used to retrieve structure template information. In one embodiment, this method is provided with, as one of its parameters, the location in the DIT where the new node is being created. Given this information, the method starts with the parent node of the new node, traversing up the line of ancestry—all the way to the root node, if necessary—until a usable set of structure templates is located. At each node along the way, the method checks for any child structure template nodes with a "class" attribute value matching the Java type of the newly created object. If any exist, they are immediately returned, ending the search. Otherwise, the search continues, moving up the tree one level at a time Once the Structure Template information is returned, an Entity Manager class creates the necessary child entries, if any, as defined by that information. In case multiple template entries are returned, of course, the proper template may be chosen for use. To this end, the "filter" and, if necessary, "priority" attributes are used. Once the proper template is picked out, an iterative child-creation process comprising four steps may be used to create all the necessary nodes. First, the values for the "childNode" attribute in the structure template are extracted. Next, each such value, along with a unique identifier for its parent node (the two values hereafter referred to as one "record"), is pushed onto a stack (i.e., a list data structure, wherein stored records are retrieved in the opposite order to that in which they are stored). Third, one record is popped off the stack, and the search described above is repeated to find the structure template entry information for that record. Finally, the child node itself is created in the directory tree. These four steps are repeated until the stack is empty. At that point, the necessary sub-structure for the new node has been created.

The present invention has many advantages over existing systems. The system of the present invention can be used to automatically enforce a standard structural hierarchy for complex directory objects. Moreover, it allows software applications to define complex composite objects in terms of other complex composite objects and directory entries. Also, the structure templates, which can be created and modified by user-friendly graphical user interfaces, allow the system administrator to easily set up and customize different structures throughout the DIT. Yet another advantage is realized in that the structure information is maintained in one place. This simplifies the task of describing and modifying directory structure. The system also provides meta information about the relative location of directory objects. The template plates are extensible, meaning their format may be modified to provide more information than described herein. For example, aci information can be added, so that default acis are oriented when each entry is created. This customization may go into Creation Template The preferred and alternative embodiments described above and illustrated in the attached drawings and tables have been provided by way of illustration only, and numerous other embodiments of the disclosed invention will be apparent to those skilled in the arts from consideration of the above description and attached drawings. Accordingly, limitations on the subject invention are to be found only in the claims set forth below.

TABLE 1

```
1   <!-- Defines the organization entry structure -->
2
3   <ServiceConfig>
4     <ServiceSubConfig name="templates">
5       <ServiceSubConfig name="StructureTemplates">
6         <ServiceSubConfig name="Organization" id="StructureUmsObjects">
7           <AttributeValuePair><Attribute name="class"/>
8             <Value>com.iplanet.ums.Organization</Value>
9           </AttributeValuePair>
10          <AttributeValuePair><Attribute name="name"/>
11            <Value>o=org</Value>
12          </AttributeValuePair>
13          <AttributeValuePair><Attribute name="childNode"/>
14            <Value>OrganizationalUnit</Value>
15            <Value>PeopleContainer</Value>
16          </AttributeValuePair>
17          <AttributeValuePair><Attribute name="template"/>
18            <Value>BasicOrganization</Value>
19          </AttributeValuePair>
20          <AttributeValuePair><Attribute name="filter"/>
21            <Value>(o=org)</Value>
22          </AttributeValuePair>
23          <AttributeValuePair><Attribute name="priority"/>
24            <Value>0</Value>
25          </AttributeValuePair>
26        </ServiceSubConfig>
27
28
29  <!-- Defines "Groups" Organizational Unit entry -->
30
31          <ServiceSubConfig name="Organizational Unit" id="StructureUmsObjects">
32            <AttributeValuePair><Attribute name="class"/>
33              <Value>com.iplanet.ums.OrganizationalUnit</Value>
34            </AttributeValuePair>
35            <AttributeValuePair><Attribute name="name"/>
36              <Value>ou=Groups</Value>
37            </AttributeValuePair>
38            <AttributeValuePair><Attribute name="childNode"/>
39              <Value>DomainAdminGroup</Value>
40              <Value>DomainHelpDeskAdminGroup</Value>
41            </AttributeValuePair>
42            <AttributeValuePair><Attribute name="template"/>
43              <Value>BasicOrganizationalUnit</Value>
44            </AttributeValuePair>
45
46            <AttributeValuePair><Attribute name="filter"/>
47              <Value>(ou=Groups)</Value>
48            </AttributeValuePair>
49            <AttributeValuePair><Attribute name="priority"/>
50              <Value>0</Value>
51            </AttributeValuePair>
52          </ServiceSubConfig>
53
54
55  <!-- Defines DomainAdminGroup entry -->
56
57          <ServiceSubConfig name="DomainAdminGroup" id="StructureUmsObjects">
58            <AttributeValuePair><Attribute name="class"/>
59              <Value>com.iplanet.ums.StaticGroup</Value>
60            </AttributeValuePair>
```

TABLE 1-continued

```
61              <AttributeValuePair><Attribute name="name"/>
62                  <Value>cn DomainAdminGroup</Value>
63              </AttributeValuePair>
64              <AttributeValuePair><Attribute name="template"/>
65                  <Value>BasicGroup</Value>
66              </AttributeValuePair>
67              <AttributeValuePair><Attribute name="filter"/>
68                  <Value>(cn=DomainAdminGroup)</Value>
69              </AttributeValuePair>
70              <AttributeValuePair><Attribute name="priority"/>
71                  <Value>0</Value>
72              </AttributeValuePair>
73          </ServiceSubConfig>
74
75
76      <!-- Defines DomainHelpDeskAdminGroup entry -->
77
78          <ServiceSubConfig name="DomainHelpDeskAdminGroup"
79          id="StructureUmsObjects">
80              <AttributeValuePair><Attribute name="class"/>
81                  <Value>com.iplanet.ums.StaticGroup<Value>
82              </AttributeValuePair>
83              <AttributeValuePair><Attribute name="name"/>
84                  <Value>cn DomainHelpDeskAdminGroup</Value>
85              </AttributeValuePair>
86              <AttributeValuePair><Attribute name="template"/>
87                  <Value>BasicGroup</Value>
88              </AttributeValuePair>
89              <AttributeValuePair><Attribute name="filter"/>
90                  <Value>(cn=DomainHelpDeskAdminGroup)</Value>
91              </AttributeValuePair>
92              <AttributeValuePair><Attribute name="priority"/>
93                  <Value>0</Value>
94              </AttributeValuePair>
95          </ServiceSubConfig>
96
97
98      <!-- Defines a People Container entry -->
99
100         <ServiceSubConfig name="PeopleContainer" id="StructureUmsObjects">
101             <AttributeValuePair><Attribute name="class"/>
102                 <Value>com.iplanet.ums.PeopleContainer</Value>
103             </AttributeValuePair>
104             <AttributeValuePair><Attribute name="name"/>
105                 <Value>ou=People</Value>
106             </AttributeValuePair>
107             <AttributeValuePair><Attribute name="template"/>
108                 <Value>BasicPeopleContainer</Value>
109             </AttributeValuePair>
110             <AttributeValuePair><Attribute name="filter"/>
111                 <Value>(ou=People)</Value>
112             </AttributeValuePair>
113             <AttributeValuePair><Attribute name="priority"/>
114                 <Value>0</Value>
115             </AttributeValuePair>
116         </ServiceSubConfig>
117       </ServiceSubConfig>
118     </ServiceSubConfig>
119 </ServiceConfig>
```

TABLE 2

```
1   public class PersistentObject implements ISearch, Serializable, IUMSConstants
2   {
3       •
4       •
5       •
6       public void addChild( PersistentObject object ) throws AccessRightsException,
7           EntryAlreadyExistsException, UMSException {
8       •
9       •
10      •
11          if (object == null) {
12      •
13      •
14      •
```

TABLE 2-continued

```
15        DataLayer.getInstance().addEntry( getPrincipal(), childGuid, object.getAttrSet()
16      );
17
18        object.setModSet( null );
19        object.setPrincipal(getPrincipal());
20
21        EntityManager em = EntityManager.getEntityManager();
22        try {
23           em.execute(getPrincipal(), object, m__guid);
24        } catch (UMSException e) {
25           // TODO - we should log error...
26           if (debug.isMessageEnabled()) {
27              debug.message("PersistentObject.addChild : UMSException : "+
28              e.getMessage());
29           }
30        }
31    }
32    •
33    •
34    •
```

What is claimed is:

1. A method for managing a directory comprising the steps of:
creating a template to define the directory comprising one or more definitions corresponding to one or more object types, wherein for a given one of said object types, said corresponding definition identifies zero or more others of said object types to be automatically created and added to the directory whenever said given object type is added to the directory;
creating an object of said given type;
adding said object of said given type to the directory;
automatically creating zero or more objects of said others of said object types whenever said given object type is added to the directory; and
adding said zero or more objects to the directory, wherein the template defines relationships between the zero or more objects of said object types.

2. The method of claim 1, wherein said zero or more objects of said others of said object types are added as children to said object of said given type in the directory.

3. The method of claim 1, wherein said one or more object types are Java object types.

4. The method of claim 1, wherein said one or more definitions comprise one or more attributes.

5. The method of claim 4, wherein said one or more attributes have values.

6. The method of claim 1, wherein said step of automatically creating zero or more objects comprises the steps of:
selecting one of said definitions that corresponds to said given type of said object that is created; and
reading said zero or more others of said object types from said selected definition.

7. The method of claim 1, wherein said template is created using a markup language.

8. The method of claim 7, wherein said markup language is one or more of the following:
an extensible markup language; and
a generalized markup language.

9. The method of claim 7, wherein said markup language is the Extensible Markup Language.

10. A template for managing a directory comprising:
one or more definitions corresponding to one or more object types, wherein for a given one of said object types, said corresponding definition identifies zero or more others of said object types of zero or more objects to be automatically created whenever an object of said given object type is added to the directory, the template specifying relationships among the zero or more objects of the one or more object types.

11. The template of claim 10, wherein said one or more object types are Java object types.

12. The template of claim 10, wherein said one or more definitions comprise one or more attributes.

13. The template of claim 10, wherein said one or more attributes have values.

14. A method for managing a directory of one or more entries comprising the steps of:
creating a template to provide one or more instruction on how to manage the directory;
automatically creating at least one of the entries whenever said given object type is added to the directory; and
adding said at least one entry to the directory in accordance with at least one of said instructions, wherein the template specifies relationships among the one or more entries.

15. The method of claim 14, further comprising the step of:
deleting said at least one entry from the directory in accordance with said instruction.

16. The method of claim 14, wherein said one or more instructions comprise one or more definitions corresponding to one or more entry types wherein for a given one of said entry types, said corresponding definition identifies zero or more of said entries that must be added to the directory whenever an entry of said given type is added to the directory.

* * * * *